(12) United States Patent
Yang et al.

(10) Patent No.: US 8,481,883 B2
(45) Date of Patent: Jul. 9, 2013

(54) WELDING METHOD AND APPARATUS

(75) Inventors: David Yang, Pudong (CN); Pei-Chung Wang, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 302 days.

(21) Appl. No.: 13/069,469

(22) Filed: Mar. 23, 2011

(65) Prior Publication Data

US 2012/0241421 A1    Sep. 27, 2012

(51) Int. Cl.
*B23K 9/00* (2006.01)
*B23K 15/00* (2006.01)
*B23K 26/00* (2006.01)

(52) U.S. Cl.
USPC ..................................... 219/121.11; 219/244

(58) Field of Classification Search
USPC ................ 219/121.11, 136, 137 R, 243, 244, 219/81–84, 119, 120
See application file for complete search history.

(56) References Cited

U.S. PATENT DOCUMENTS

| | | | | |
|---|---|---|---|---|
| 2,196,192 A | * | 4/1940 | Broadfield | 228/220 |
| 3,453,725 A | * | 7/1969 | Donelan et al. | 29/599 |
| 7,950,124 B2 | * | 5/2011 | Stuth | 29/417 |

* cited by examiner

*Primary Examiner* — Samuel M Heinrich
(74) *Attorney, Agent, or Firm* — Christopher W. Quinn

(57) ABSTRACT

A welding apparatus for welding a work-piece includes an energy source configured to generate a weld in a zone of the work-piece, with the work-piece characterized by a layer. The apparatus also includes a first wheel characterized by a first circumference and a first set of protrusions disposed on the first circumference, and a second wheel characterized by a second circumference and a second set of protrusions disposed on the second circumference. Each of the first and second wheels is configured to rotate relative to the work-piece, and the first and second sets of protrusions are configured to disrupt the layer as the work-piece is traversed between the first and second wheels. The energy source generates the weld in the zone of the work-piece following the disruption of the layer. A method employing the disclosed welding apparatus is also provided.

20 Claims, 2 Drawing Sheets

WELDING METHOD AND APPARATUS

TECHNICAL FIELD

The invention relates to a method and an apparatus for welding of components.

BACKGROUND

Welding is a fabrication or process that joins materials, usually metals or thermoplastics, by causing coalescence. This is often done by melting the work-piece and/or adding a filler material to form a pool of molten material, a.k.a., the weld pool. After the weld pool cools, a high strength joint is produced.

The quality, and therefore the strength of the welded joint is closely related to surface conditions of the work-piece, such as contamination and oxide formation on the surface of the substrates. Furthermore, depending on the type and quality of the materials sought to be joined, the same welding process may expend/consume vastly different amounts of energy to generate a robust weld.

A welding process that expends more energy may require larger, heavier, more powerful, and thus more expensive welding equipment. Such increased consumption of welding energy tends to reduce the overall efficiency of the welding operation, and, coupled with the higher cost and footprint of the welding equipment, tends to increase the effective cost of the finished assembly.

SUMMARY

A welding apparatus for welding a work-piece includes an energy source configured to generate a weld in a zone of the work-piece, with the work-piece characterized by a layer. The apparatus also includes a first wheel characterized by a first circumference and a first set of protrusions disposed on the first circumference, and a second wheel characterized by a second circumference and a second set of protrusions disposed on the second circumference. Each of the first and second wheels is configured to rotate relative to the work-piece, and the first and second sets of protrusions are configured to disrupt the layer as the work-piece is traversed between the first and second wheels. The energy source generates the weld in the zone of the work-piece following the disruption of the layer.

At least one of the first and second wheels may be configured to vibrate at a predetermined frequency, wherein the predetermined frequency may be in the range of approximately 20-40 KHz.

The welding apparatus may also include a controller configured to regulate the traversal of the work-piece between the first and second wheels and regulate the energy source to generate the weld. The welding apparatus may additionally include a fixture configured to move the work-piece relative to the first and second wheels such that the first and second wheels are caused to rotate relative to the work-piece, wherein the controller may regulate the fixture. Furthermore, the welding apparatus may include a mechanism configured to rotate at least one of the first and second wheels such that the work-piece is caused to traverse relative to the first and second wheels, wherein the controller may regulate the mechanism.

The energy source may be configured as one of a laser beam, an electron beam, a plasma beam, a welding arc, and a hybrid energy source such as a laser/arc.

The work-piece may include adjacent substrates that contact at an interface, such that the zone is formed at the interface. At least one of the substrates may be formed from one of a ferrous and a non-ferrous material such as steel, aluminum, and magnesium.

The layer may include an oxide coating and/or material contaminants disposed on the surface of at least one of the adjacent substrates.

A method employing the welding apparatus is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
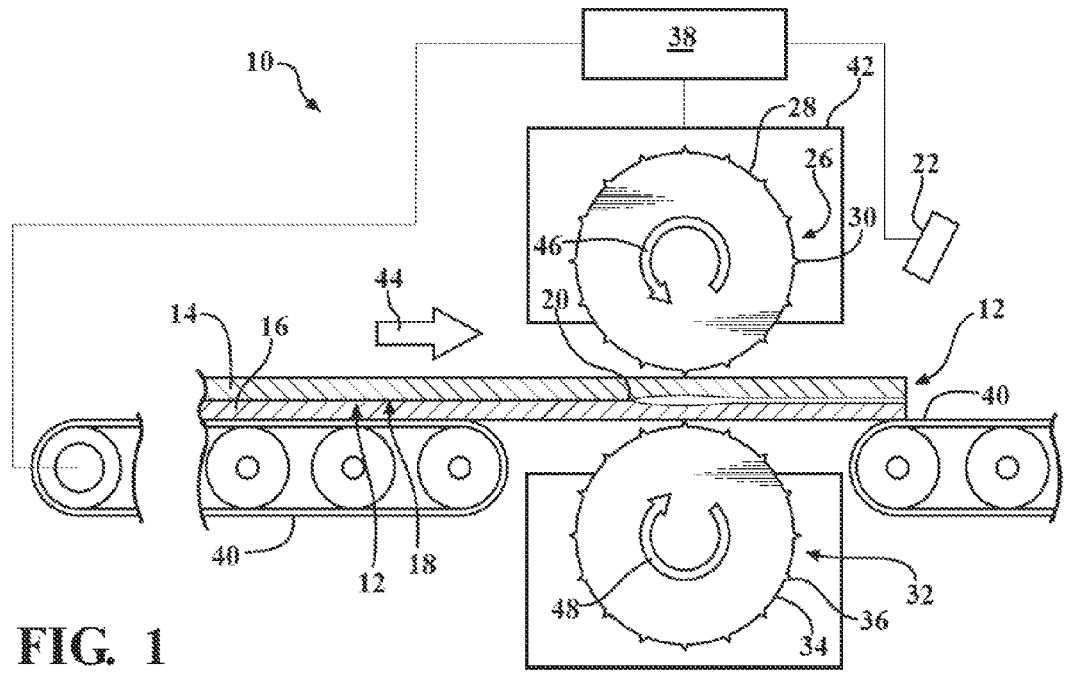
FIG. 1 is a schematic illustration of a cross-section of a welding apparatus and showing a work-piece formed from two abutted sheets of material being traversed through the apparatus.
Figure 2:
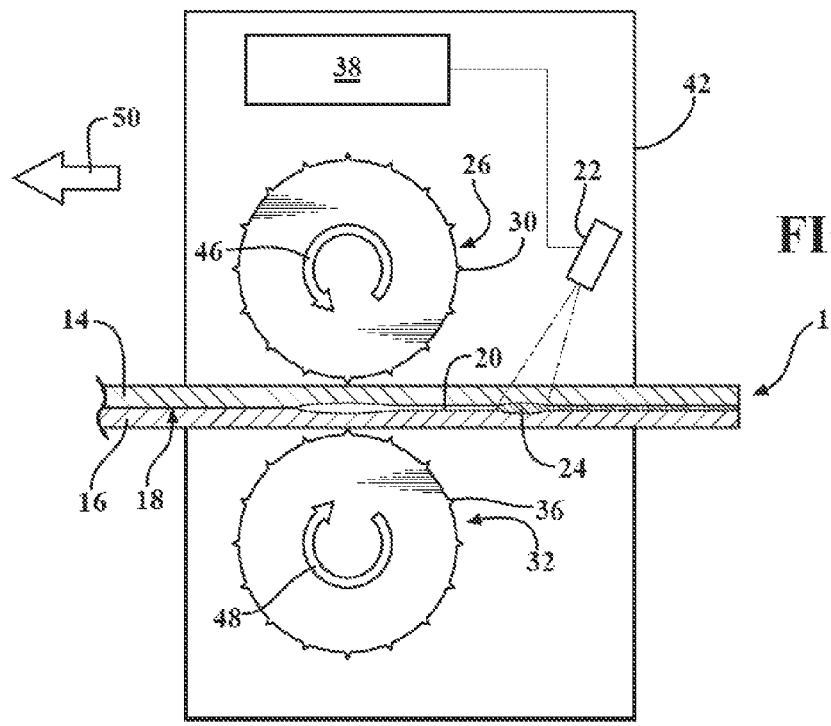
FIG. 2 is a schematic illustration of the cross-section of the welding apparatus similar to the apparatus shown in FIG. 1, but with the apparatus being traversed over the work-piece and an energy source generating a weld.

Referring to the drawings in which like elements are identified with identical numerals throughout, FIGS. 1 and 2 illustrate a welding apparatus 10 for welding a work-piece 12. As shown, the work-piece 12 includes adjacent substrates 14, 16 that are shown as two abutted sheets of material positioned with respect to the weld apparatus 10 in order to be joined by a weld. Although substrates 14, 16 are shown as two sheets of material, each of the substrates may also have a largely variable shape that additionally includes two opposite, substantially planar surfaces configured to be joined by a weld. Each of the substrates 14, 16 may be formed from either a ferrous or a non-ferrous material that is suitable for being welded, such as steel, aluminum, and magnesium.

As shown in FIGS. 1-2, the work-piece 12 is characterized by a layer 18. The layer 18 is disposed on the outer surfaces of the substrates 14, 16 and may include an oxide coating that covers one or more planes of each substrate. Accordingly, the layer 18 may surround each of the substrates 14, 16. The layer 18 is typically caused by oxidation of materials such as aluminum or magnesium that is formed when such materials are exposed to ambient conditions. The layer 18 may also include impurities or contaminants of the subject material. The layer 18 on the outer surfaces of the substrates 14, 16 typically reflects heat energy generated by an appropriate heat source, e.g., laser, and therefore affects heat generation at an interface 20 between the substrates by the welding apparatus 10 when the work-piece 12 is being welded. Consequently, the presence of oxide coating and/or contaminants on the layer 18 is generally detrimental to the efficiency of the welding process and the quality of the finished weld joint, in part because the reflected heat is wasted energy which, in turn, must be compensated for by a more powerful welding apparatus 10. Additionally, a surface layer that is formed from oxide typically decomposes at elevated temperatures, such as above 2,000 degrees Celsius that generally characterize laser welding processes. A decomposed oxide layer typically forms inconsistencies, such as porosity and/or cracks that become trapped in the weld pool and result in a weaker weld joint.

The welding apparatus 10 includes an energy source 22 configured to generate a weld in a zone 24 formed at the interface 20 (shown in FIG. 2). Accordingly, the energy source 22 may be configured as any appropriate generator of a pool of welded material in the zone 24, for example a laser beam, an electron beam, a plasma beam, a welding arc, or a hybrid energy source such as a laser/arc. The heat generated by the heat source 22 typically penetrates the layer 18 at the interface 20 and extends at least partially into the substrates 14, 16. Consequently, the zone 24 formed at the interface 20 may include portions of the substrates 14, 16, such that the weld pool includes the metal of the substrates themselves.

The welding apparatus 10 also includes a first generally circular wheel 26. The first wheel 26 is characterized by an outer surface 28 having a first circumference. The first wheel 26 includes a first set of protrusions or teeth 30 disposed on the first circumference. The first wheel 26 is configured to rotate relative to the work-piece 12. The welding apparatus 10 also includes a second wheel 32 characterized by an outer surface 34 having a second circumference. The second wheel 32 includes a second set of protrusions or teeth 36 disposed on the second circumference. Similarly to the first wheel 26, the second wheel 32 is also configured to rotate relative to the work-piece 12.

The first and second sets of protrusions 30, 36 are configured to disrupt the surface layer 18 as the work-piece 12 is effectively clamped between the first and second wheels 26, 32 and is traversed there between. The disruption of the layer 18 is achieved by means of mechanical fracturing of the layer, thus permitting the energy generated by the energy source 22 to be absorbed more effectively by the substrates 14, 16. Accordingly, the energy source 22 is positioned to heat the work-piece 12 and generate a weld in the zone 24 of the work-piece shortly following the disruption of the layer 18 in order to generate a higher quality weld pool.

In order to disrupt the surface layer 18 as the work-piece 12 is traversed between the first and second wheels 26, 32 at least one of the first and second wheels is configured to vibrate at a predetermined frequency as the wheels subject the work-piece to a clamping load. The subject frequency may be established empirically during development of the weld process using the weld apparatus 10, wherein the objective would be sufficient disruption of the layer 18 to generate an effective weld with minimized power consumption by the weld apparatus. According to initially conducted development of the welding apparatus 10, in one possible embodiment, the predetermined frequency may be in the ultrasonic range of approximately 20-40 KHz under a clamping load in the range of 0.5-10 kilonewtons (kN).

As shown in FIGS. 1 and 2, the welding apparatus 10 includes a controller 38 configured to regulate the traversal of the work-piece 12 between the first and second wheels 26, 32, and regulate the energy source 22 to generate the weld. As shown in FIG. 1, the welding apparatus 10 may also include a fixture 40 which may be incorporated into a conveyor. The fixture 40 may thus be configured to move the work-piece 12 at an appropriate rate relative to the first and second wheels 26, 32, such that the first and second wheels are caused to rotate relative to the work-piece 12. In such a case, the controller 38 is configured to regulate the operation of the fixture 40 to traverse the work-piece 12 relative to the first and second wheels 26, 32. Accordingly, as the first and second wheels 26, 32 are rotated and vibrated, the first and second sets of protrusions 30, 36 repeatedly engage the surface of work-piece 12 and disrupt the layer 18.

As shown in FIG. 2, the welding apparatus 10 may also include a mechanism 42 configured to rotate the first wheel 26 and may also be configured to rotate the second wheel 32, such that the work-piece 12 is caused to traverse relative to the first and second wheels at an appropriate rate. In such a case, the controller 38 is configured to regulate the mechanism 42 to rotate and vibrate the first and second wheels 26, 32. Accordingly, as the first and second wheels 26, 32 rotate relative to the work-piece 12 the first and second sets of protrusions 30, 36 repeatedly engage the surface of work-piece and disrupt any oxides and/or contaminants of the layer 18.

As shown in FIG. 1, in the case when the work-piece 12 is being traversed by the fixture 40 in the direction represented by an arrow 44, the two wheels are rotated in opposite directions, thus permitting the work-piece to pass between the wheels. In particular, when the first wheel 26 is rotated counterclockwise, as shown by an arrow 46, the second wheel 32 is rotated in the opposite direction, i.e., clockwise, as shown by an arrow 48. Similarly, as shown in FIG. 2, whether the mechanism 42 is used to rotate both the first and second wheels 26, 32 or just one of the wheels in order to pull the work-piece through the first and second wheels, or to simply move the assembly of the first and second wheels relative to the work-piece 12, the two wheels rotate in opposite directions represented by the arrows 46 and 48.

With continued reference to FIG. 2, and as noted above, the assembly of first and second wheels 26, 32 may be moved by the mechanism 42 relative to the work-piece 12. The direction of such movement of the assembly of first and second wheels 26, 32 is represented by an arrow 50. Additionally, as noted, either one or both of the first and second wheels 26, 32 may be employed as the active wheel(s) driven by the mechanism 42. In the case that the mechanism 42 is used to rotate only one of the first and second wheels 26, 32, either the first wheel 26 or the second wheel 32 may be employed as an idler wheel that is rotated in response to the other of the two wheels pulling the work-piece 12 through and between the first and second wheels.

Figure 3:
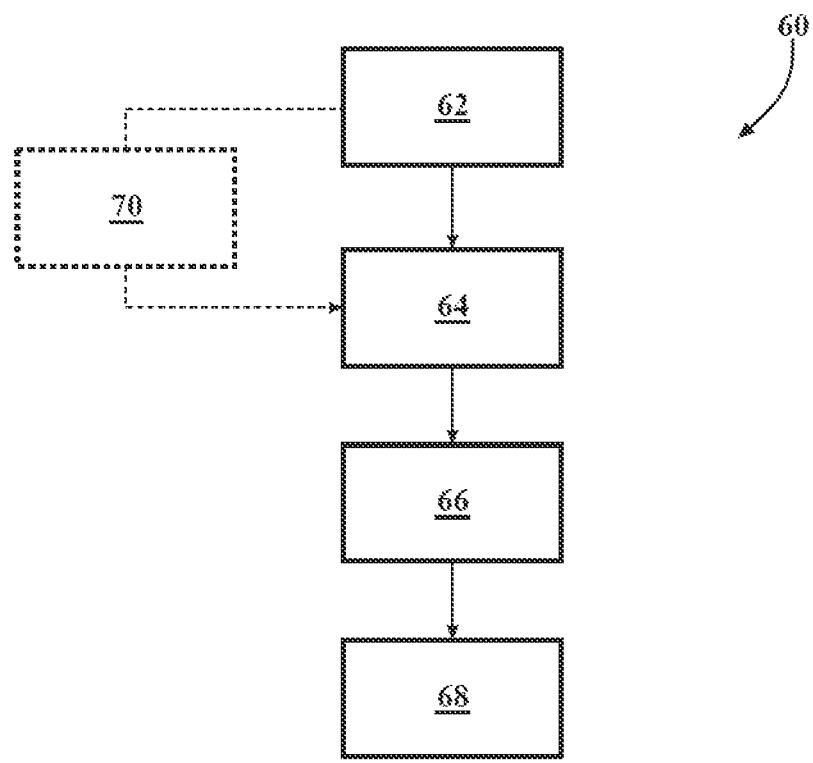
FIG. 3 is a flow chart illustrating a method of welding a work-piece via the welding apparatus.

FIG. 3 depicts a method 60 of welding the work-piece 10. The method 60 is described herein with respect to joining the substrates 14 and 16 of the work-piece 12 in the welding apparatus 10 shown in FIGS. 1 and 2. The method commences in frame 62 with substrates 14, 16 being abutted for processing by the welding apparatus 10. After frame 62, the method proceeds to frame 64 with traversing the work-piece 12 between the first wheel 26 and the second wheel 32, such that the first wheel and the second wheel are rotated relative to the work-piece 12.

Following frame 64, the method advances to frame 66, where it includes disrupting the layer 18 of the work-piece 12 by the first and second sets of protrusions 30, 36 as the work-piece is traversed between the first and second wheels 26, 32. While the work-piece 12 is traversed between the first and second wheels 26, 32, ultrasonic vibration of at least one of the first and second wheels may serve to further disrupt the layer 18. From frame 66, the method proceeds to frame 68, where the method includes generating a weld in the zone 24 of the work-piece 12 by the energy source 22 following the disruption of the layer 18. The controller 38 may be used to regulate the energy source 22 for generating the weld.

Between frames 62 and 64, the method 60 may proceed to frame 70 where the method additionally includes regulating the traversal of the work-piece 12 between the first and second wheels 26, 32 via the controller 38. In frame 70 the method may include moving the work-piece 12 relative to the first and second wheels 26, 32 via the fixture 40 such that the first and second wheels are caused to rotate and vibrate relative to the work-piece to disrupt and remove any oxides and/or contaminants of the layer 18. Alternatively, in frame 70 the method may include rotating at least one of the first and second wheels 26, 32 such that the work-piece 12 is caused to traverse relative to the first and second wheels via the mechanism 42.

While the best modes for carrying out the invention have been described in detail, those familiar with the art to which this invention relates will recognize various alternative designs and embodiments for practicing the invention within the scope of the appended claims.

The invention claimed is:

1. A welding apparatus for welding a work-piece, the welding apparatus comprising:
    an energy source configured to generate a weld in a zone of the work-piece, wherein the work-piece is characterized by a layer;
    a first wheel characterized by a first circumference and having a first set of protrusions disposed on the first circumference, the first wheel being configured to rotate relative to the work-piece; and
    a second wheel characterized by a second circumference and having a second set of protrusions disposed on the second circumference, the second wheel being configured to rotate relative to the work-piece;
    wherein:
        the first and second sets of protrusions are configured to disrupt the layer as the work-piece is traversed between the first and second wheels; and
        the energy source generates the weld in the zone of the work-piece following the disruption of the layer.

2. The welding apparatus of claim 1, wherein at least one of the first and second wheels is configured to vibrate at a predetermined frequency.

3. The welding apparatus of claim 1, wherein the predetermined frequency is in the range of approximately 20-40 KHz.

4. The welding apparatus of claim 1, further comprising a controller configured to regulate the traversal of the work-piece between the first and second wheels and regulate the energy source to generate the weld.

5. The welding apparatus of claim 4, further comprising a fixture configured to move the work-piece relative to the first and second wheels such that the first and second wheels are caused to rotate relative to the work-piece, wherein the controller regulates the fixture.

6. The welding apparatus of claim 4, further comprising a mechanism configured to rotate at least one of the first and second wheels such that the work-piece is caused to traverse relative to the first and second wheels, wherein the controller regulates the mechanism.

7. The welding apparatus of claim 1, wherein the energy source is configured as one of a laser beam, an electron beam, a plasma beam, a welding arc, and a hybrid energy source.

8. The welding apparatus of claim 1, wherein the work-piece includes adjacent substrates that contact at an interface, the zone is formed at the interface, and wherein at least one of the substrates is formed from one of a ferrous and a non-ferrous material.

9. The welding apparatus of claim 8, wherein the layer includes an oxide coating disposed on the surface of at least one of the adjacent substrates.

10. The welding apparatus of claim 8, wherein the layer includes material contaminants disposed on the surface of at least one of the adjacent substrates.

11. A method of welding a work-piece, the method comprising:
    traversing the work-piece between a first wheel and a second wheel, wherein the work-piece includes a zone characterized by a layer, the first wheel is characterized by a first circumference and has a first set of protrusions disposed on the first circumference, the first wheel being configured to rotate relative to the work-piece, and wherein the second wheel is characterized by a second circumference and has a second set of protrusions disposed on the second circumference, the second wheel being configured to rotate relative to the work-piece;
    disrupting the layer of the work-piece by the first and second sets of protrusions as the work-piece is traversed between the first and second wheels; and
    generating a weld in the zone of the work-piece by an energy source following the disruption of the layer.

12. The method of claim 11, wherein said disrupting the layer is accomplished via vibrating at least one of the first and second wheels at a predetermined frequency.

13. The method of claim 11, wherein the predetermined frequency is in the range of approximately 20-40 KHz.

14. The method of claim 11, further comprising regulating the traversal of the work-piece between the first and second wheels and regulating the energy source to generate the weld via a controller.

15. The method of claim 14, further comprising moving the work-piece relative to the first and second wheels via a fixture such that the first and second wheels are caused to rotate relative to the work-piece, wherein the controller regulates the fixture.

16. The method of claim 14, further comprising rotating at least one of the first and second wheels such that the work-piece is caused to traverse relative to the first and second wheels via a mechanism, wherein the controller regulates the mechanism.

17. The method of claim 11, wherein the energy source is configured as one of a laser beam, an electron beam, a plasma beam, a welding arc, and a hybrid energy source.

18. The method of claim 11, wherein the work-piece includes adjacent substrates, the zone includes an interface between the adjacent substrates, and wherein at least one of the substrates is formed from one of a ferrous and a non-ferrous material.

19. The method of claim 18, wherein the layer includes at least one of an oxide coating and material contaminants disposed on the surface of at least one of the adjacent substrates.

20. A welding apparatus for welding a work-piece, the welding apparatus comprising:
    an energy source configured to generate a weld in a zone of the work-piece, wherein the work-piece is characterized by a layer;
    a first wheel characterized by a first circumference and having a first set of protrusions disposed on the first circumference, the first wheel being configured to rotate relative to the work-piece;
    a second wheel characterized by a second circumference and having a second set of protrusions disposed on the second circumference, the second wheel being configured to rotate relative to the work-piece; and
    a controller configured to regulate the apparatus;
    wherein:
        the first and second sets of protrusions are configured to disrupt the layer as the work-piece is traversed between the first and second wheels;
        the energy source generates the weld in the zone of the work-piece following the disruption of the layer;
        at least one of the first and second wheels is configured to vibrate at a predetermined frequency; and the controller regulates the traversal of the work-piece between the first and second wheels and regulates the energy source to generate the weld.

* * * * *